United States Patent [19]

Brown

[11] 4,428,628
[45] Jan. 31, 1984

[54] HIGH SPEED, DURABLE ROLLER BEARING

[75] Inventor: Paul F. Brown, Bolton, Conn.

[73] Assignee: United Technologies Corporation, Hartford, Conn.

[21] Appl. No.: 315,325

[22] Filed: Oct. 26, 1981

[51] Int. Cl.³ .................. F16C 19/00; F16C 33/66; F16C 33/58; F16C 33/48
[52] U.S. Cl. ........................... 308/187; 308/202; 308/216; 308/217
[58] Field of Search ............... 308/207 R, 215, 216, 308/217, 202, DIG. 15, 187, 212, 213

[56] References Cited

U.S. PATENT DOCUMENTS

| | | | |
|---|---|---|---|
| 1,386,986 | 8/1921 | Brierley | 308/212 |
| 1,572,725 | 2/1926 | Keller | 308/215 |
| 1,622,985 | 3/1927 | Weibull | 308/215 |
| 2,611,669 | 9/1952 | Palmgren | 308/213 |
| 3,528,711 | 9/1970 | Atkinson | 308/187 |
| 3,713,712 | 1/1973 | Derner et al. | 308/215 |
| 3,980,359 | 9/1976 | Wetherbee | 308/235 X |
| 4,002,380 | 1/1977 | Bowen | 308/215 X |
| 4,129,344 | 12/1978 | Hörmann | 308/187 |

FOREIGN PATENT DOCUMENTS 1372755  8/1964  France ............................. 308/207

*Primary Examiner*—Stuart S. Levy
*Assistant Examiner*—Thomas R. Hannon
*Attorney, Agent, or Firm*—Russell M. Lipes, Jr.

[57] ABSTRACT

A construction for a high speed, high DN roller bearing including an outer race 10, a split inner race 12, two rows of bearing rollers 18 and 20, the rollers having an L/D of less than 0.866, a groove guided single piece retainer cage 22 and passages 30, 32, 34, 36, 38 and 42 through which oil is provided to cool and lubricate the bearing components.

3 Claims, 5 Drawing Figures

HIGH SPEED, DURABLE ROLLER BEARING

TECHNICAL FIELD

This invention relates to roller bearings and more particularly to high speed, high DN roller bearings.

BACKGROUND ART

In connection with roller bearings used in high speed installations, such as in jet aircraft engines, roller wear has been a problem. Typically the ends of the rollers will wear, sometimes to the extent that the roller ends will become axle-like. As a result of this type of wear, the rollers are no longer properly guided by the races and a rocking motion can ensue due to gyroscopic forces. This motion will wear and eventually destroy the cage which will result in failure of the bearing. Wear problems have been accentuated as the bearing DN factor, the measure of linear surface speed as determined by the diameter of the bore of the rotating inner race in mm times the rotational speed in rpm, increases. For earlier jet aircraft engines, the DN was about 1.4 million but current engines have DN levels up to 2.4 million and it is anticipated that reliable bearing operation must be provided for advanced engines at a DN of 3 million and greater.

I have found that a two-row, low L/D (length/diameter) ratio bearing roller concept provides a bearing with no loss in radial stiffness compared to a conventional roller bearing and permits the use of a gyroscopically stable roller feature necessary for dependable high speed operation.

Wetherbee U.S. Pat. No. 3,980,359 shows a ball bearing construction in which a single row of balls is retained by a scalloped ring and in which the inner race is split. Keller U.S. Pat. No. 1,572,725 shows a plurality of tire-shaped rollers having slightly hollowed ends, and Derner et al. U.S. Pat. No. 3,713,712 discloses a roller bearing having hollow ends of almost circular concavity. The patent to Weibull, U.S. Pat. No. 1,622,985 teaches that for a desired shape of an "ellipsoid of inertia", the breadth of a solid cylindrical roller in a bearing must not exceed the product of the radius of the roller times $\sqrt{3}$. Canadian Pat. No. 553,811 shows a bearing construction utilizing a pair of spherical rollers in separate concave inner raceways, the ends of the rollers being recessed to reduce stress concentration.

DISCLOSURE OF INVENTION

An object of the present invention is the provision of a roller bearing structure subject to a high DN which has a long wear life.

Another object of the invention is to provide bearings for jet aircraft engines which have long wear lives under the rotational speed and load conditions imposed by the operation of such engines.

A further object of the invention is to provide a high DN inner race rotating roller bearing that has rollers possessing a high degree of rotational axis stability resulting in reduced skew forces and long wear life, with no loss of radial stiffness compared to a conventional roller bearing, and with a lightweight cage that is inner race groove guided.

Accordingly, in the invention the bearing structure involves two rows of rollers with each roller being hollow ended and having a length-to-diameter ratio (L/D) of less than 0.866, and with a split inner race which defines a center groove guiding a single piece cage for the rollers.

The foregoing and other objects, features and advantages will be apparent from the specification and claims and from the accompanying drawings which illustrate an embodiment of the invention.

BEST MODE FOR CARRYING OUT THE INVENTION

Figure 1:
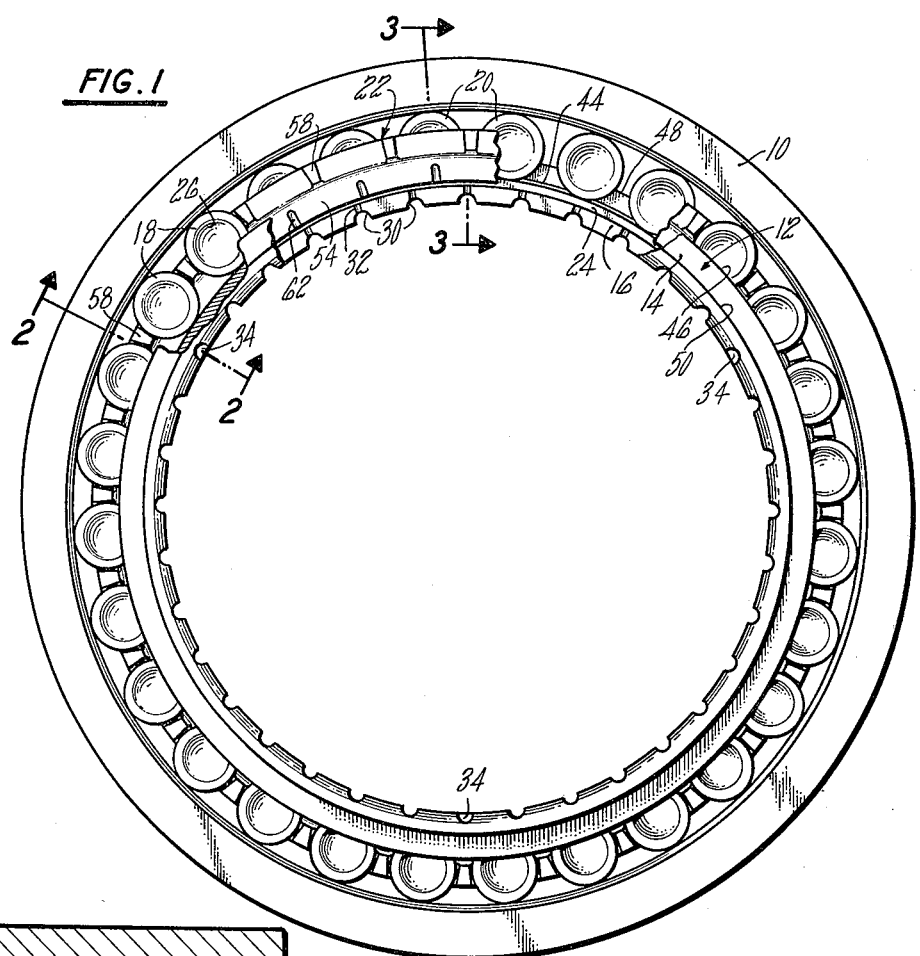
FIG. 1 is an end view of an assembled bearing with a portion being fragmented to show details of the assembly.
Figure 2:
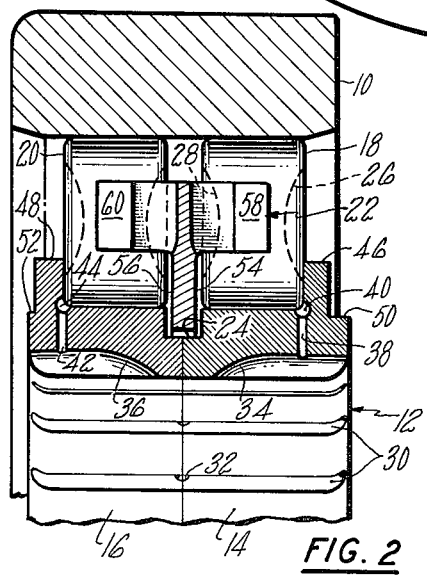
FIG. 2 is a section view taken along 2—2 of FIG. 1.
Figure 3:
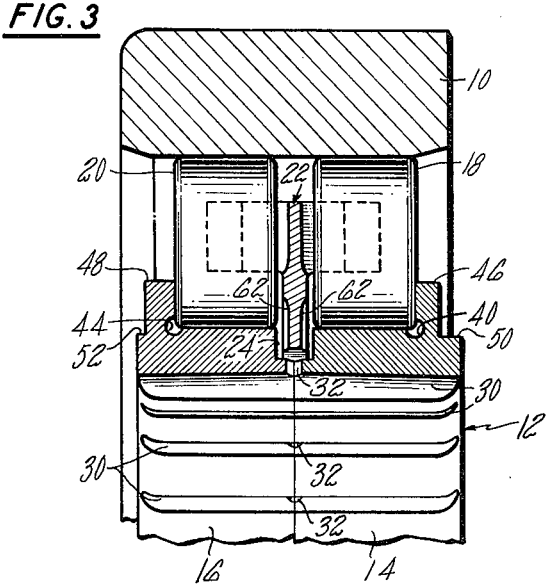
FIG. 3 is a section view taken along 3—3 of FIG. 1.

The basic elements of the bearing are an outer race, a split inner face, two rows of rollers and a roller retainer cage. In FIGS. 1, 2 and 3, the bearing is shown as including outer race 10, inner race 12 comprising inner race piece 14 and complementary inner race piece 16, a plurality of circular rollers 18 between outer race 10 and inner race piece 14 and a plurality of similar rollers 20 between outer race 10 and inner race piece 16, the two circumferential rows of rollers being in parallel planes. The second row of rollers provides compensation for the loss of radial stiffness and load capacity due to the relative decrease in roller length as compared to standard rollers which have an L/D greater than one and typically in the range of 1.0 to 2.0. Cage 22 is mounted between the two rows of rollers and is guided by groove 24, a portion of which is defined in adjacent faces of inner race pieces 14 and 16.

Rollers 18 and 20 have an L/D ratio of 0.866 or less to insure their gyroscopic stability and thus reduce their tendency to skew under the high DN conditions at which the bearing is intended to operate. The rollers may be made hollow as shown in FIG. 2 at 26 and 28 on roller 18 or even completely hollow to add further to their gyroscopic stability and to reduce their mass which reduces centrifugal loading having a favorable effect on bearing rolling contact fatigue life and wear life. In addition, the peripheral surface of the rollers may have crown relief to avoid stress concentration at the edges of the surface and also to allow accommodation for misalignment.

Inner race pieces 14 and 16 have a number of slots and passages to provide for the flow of oil for cooling and lubricating. A plurality of parallel slots 30 extend axially across the inner circumference of bearing inner race 12. The slots may, however, be helically arranged to take advantage of centrifugal forces due to rotation of the bearing. Radial passage 32 connects each oil slot 30 to retainer cage groove 24, the passage being wholly in one inner race piece, as shown in FIGS. 2 and 3, consisting of a semicircular face groove in each inner race piece. With a passage, or a portion thereof, in each inner race piece, circumferential alignment of the oil slots in each inner race piece is not essential to insure the flow of oil to the retainer cage groove. A number of the oil slots, three in each inner race in this embodiment, are dead ended, as in FIG. 2 at 34 in inner race piece 14 and at 36 in inner race piece 16. Each of the dead ended slots is connected by a radial passage in the inner race piece to a circumferential groove on the outer surface of the inner race piece for supplying oil to the rollers. For example, in inner race piece 14, passage 38 connects dead ended groove 34 to circumferential groove 40, and in inner race piece 16 passage 42 connects dead ended groove 36 to circumferential groove 44. Inner race pieces 14 and 16 have flanges 46 and 48, respectively, to guide and retain the rollers and the flanges have relief cuts 50 and 52, respectively, in their outboard faces. The relief cuts are for the purpose of preventing loss of end clearance between rollers 18 and 20, cage retainer 22 and inner race piece flanges 46 and 48. Loss of end clearance can occur from deflection of the flanges resulting from axial clamping loads applied to the inner race assembly to prevent rotation on the shaft on which it is installed during operation. The relief cuts assure that the clamping force is applied through the solid section of the inner race pieces and not through the more flexible flanges.

Figure 4:
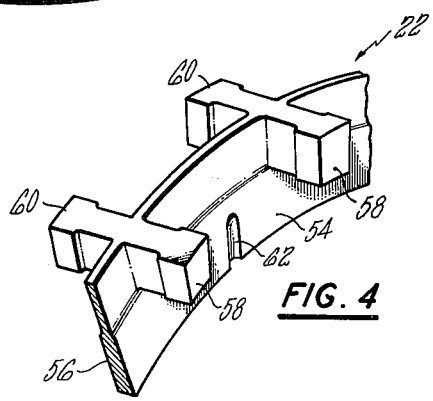
FIG. 4 is a fragmentary perspective view of the bearing cage.

Cage 22 is a single piece circular member and a sector is shown in FIG. 4. Cage surface 54 and the opposite surface 56 provide roller guidance on the inside end surfaces of each roller row, guidance on the outside end of the faces for rollers 18 being provided by flange 46 on inner race piece 14 and on the outside end of the faces for rollers 20 being provided by flange 48 on inner race piece 16. The cage also serves to provide necessary separation of the two roller rows in addition to satisfying the requirement of circumferential spacing. Projections 58 extending from the right side of the cage, as shown, provide circumferential spacing for rollers 18, and projections 60 extending from the left side of the cage and located opposite projections 58 provide circumferential spacing for rollers 20. A plurality of radially extending dead ended slots 62 are provided on each side of the cage in surfaces 54 and 56 at locations between projections 58 and 60 for the flow of oil from inner race groove 24 to the rollers. Due to the speed differential between the cage and the inner race, the cage is hydrodynamically supported and cooled by the oil in and passing through the groove 24.

Figure 5:
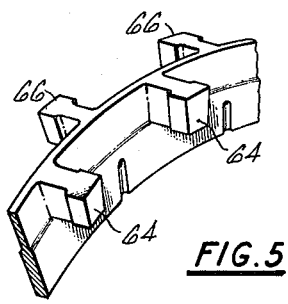
FIG. 5 is a fragmentary perspective view of an alternate bearing cage.

An alternate cage construction is shown in FIG. 5. In this construction projections 64 and 66, similar to projections 58 and 60 in FIG. 4, are offset circumferentially with respect to each other by an amount equal to one-half the pitch distance of the rollers. This arrangement of the cage projections provides a more uniform mass distribution around the periphery of the cage which reduces centrifugally induced stress concentrations and thus is more suitable for high speed operation.

It should be understood that the invention is not limited to the particular embodiment shown and described herein, but that various changes and modifications may be made without departing rom the spirit or scope of this concept as defined by the following claims.

I claim:

1. A high speed roller bearing including an outer race, an inner race consisting of two pieces having adjacent faces, a row of rollers mounted between the outer race and each inner race piece, said rollers having a length-to-diameter (L/D) ratio of less than 0.866 and having parallel rotational axes, the adjacent faces of each inner race piece having a recess defining together a circumferential groove and the opposite face of each inner case piece having a flange to guide and retain said rollers, a retainer cage located between the rows of rollers and guided by said cicumferential groove, and means in said inner race pieces for supplying cooling and lubricating oil to said rollers and said cage.

2. A roller bearing in accordance with claim 1 in which the cage has means for providing cooling and lubricating oil to said rollers.

3. A roller bearing in accordance with claim 1 in which the cage has projections offset circumferentially one from the other by an amount equal to one-half the pitch distance of the rollers.

* * * * *